March 11, 1952 S. J. BUDLANE 2,588,348
FUEL FEEDING SYSTEM FOR HEATERS
Filed Feb. 1, 1946 4 Sheets-Sheet 1

INVENTOR.
STANLEY J. BUDLANE
BY
Mueller and Mason
ATTORNEYS

March 11, 1952  S. J. BUDLANE  2,588,348
FUEL FEEDING SYSTEM FOR HEATERS
Filed Feb. 1, 1946  4 Sheets-Sheet 2
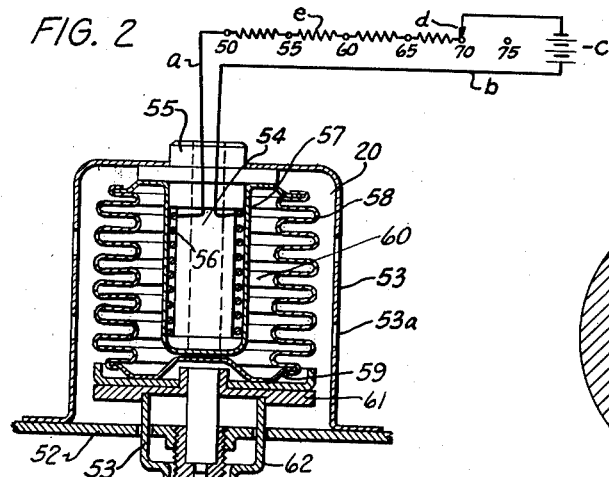
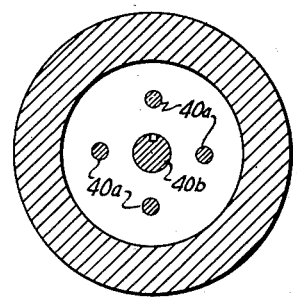
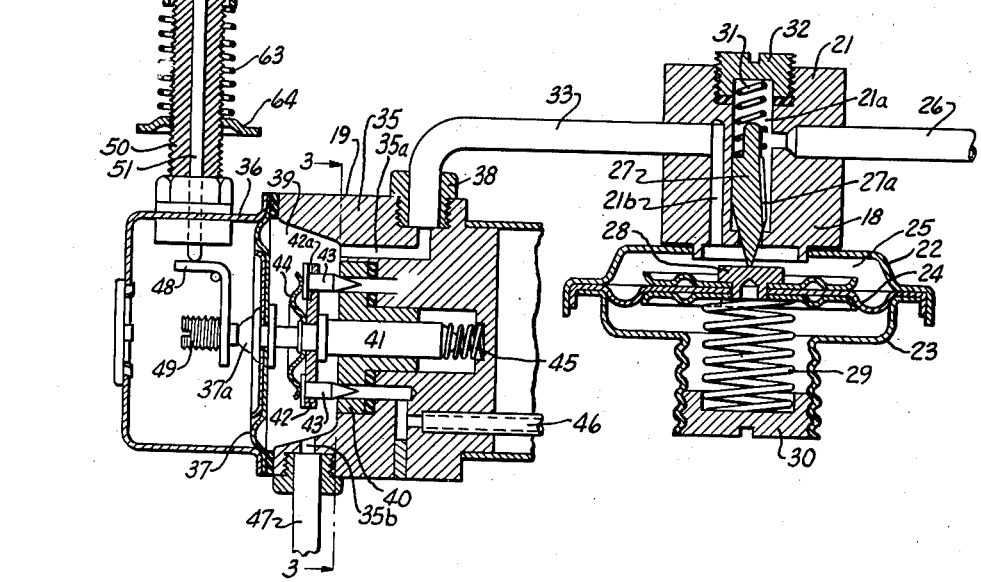
INVENTOR.
STANLEY J. BUDLANE
BY
Mueller and Mason
ATTORNEYS

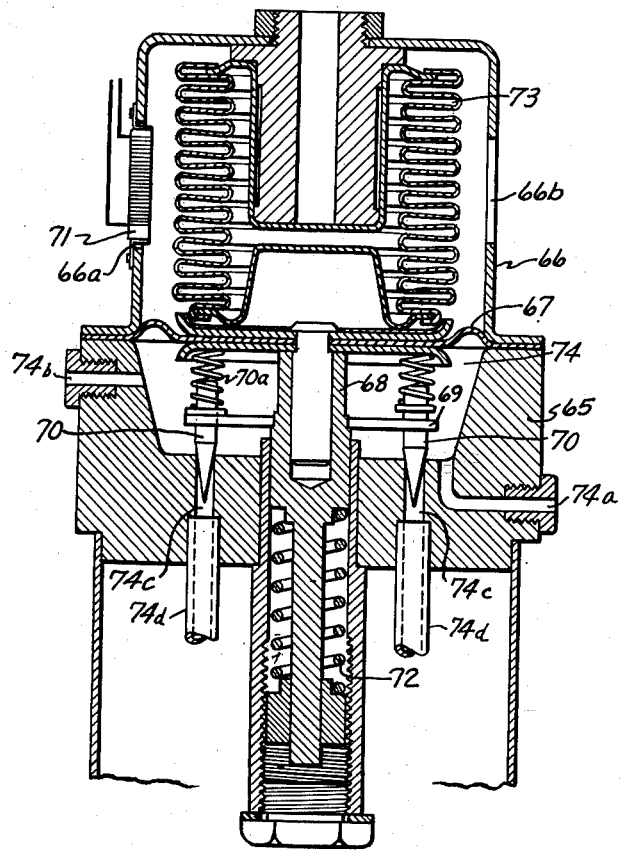

March 11, 1952 S. J. BUDLANE 2,588,348
FUEL FEEDING SYSTEM FOR HEATERS
Filed Feb. 1, 1946 4 Sheets-Sheet 4

INVENTOR.
STANLEY J. BUDLANE
BY
Mueller and Mason
ATTORNEYS

Patented Mar. 11, 1952

2,588,348

UNITED STATES PATENT OFFICE 2,588,348

FUEL FEEDING SYSTEM FOR HEATERS

Stanley J. Budlane, Chicago, Ill., assignor to Motorola, Inc., a corporation of Illinois Application February 1, 1946, Serial No. 644,693

6 Claims. (Cl. 236—10)

This invention relates generally to heating apparatus and in particular to a fuel-feeding system for use in internal combustion type heaters for automobile, for portable use, and for other installations. Reference is made to my co-pending application, Serial No. 644,694, filed of even date herewith, disclosing and claiming a multiple-burner heater apparatus.

In the prior art, difficulties have been experienced in the design of internal combustion type heaters which will provide efficient operation over a wide range of varying heat outputs. Heaters used in automobiles and for general portable use must be capable of producing a small amount of heat in relatively cool weather and also be able to produce a large amount of heat in extremely cold weather. The heater must, of course, be designed to produce the maximum heat required, and such design has normally resulted in heaters which are very inefficient and operate unsatisfactorily when producing a small amount of heat.

Attempts have been made to provide an internal combustion heater which will operate efficiently over a wide range of heat outputs by providing a plurality of burners in the heating device, one or more of which may operate at any time to provide a varying heat output with each individual burner being variable only over a small range. Multi-burner heating units have been used in large heating systems where complicated systems may be used, but have not been adapted for use as automobile or portable heaters and are not suitable for such use merely by reduction in size. Furthermore, efforts have been made to provide variable heat output by maintaining burning at a maximum but varying the heated air delivery from the heater. However, none of these expedients have provided the desired range in heat delivery nor desired efficiency of operation at any range.

It is also desirable in an automobile or portable heating system to provide automatic means for providing the temperature desired. No commercially satisfactory means has been provided to accomplish this in the prior devices.

It is an object of this invention, therefore, to provide an internal combustion heater which will operate efficiently over a wide range and variation of heat outputs.

It is a further object of this invention to provide automatic means for varying the heat output from a heater in accordance with the existing temperature of the air in the space to be heated.

It is an additional object of this invention to provide in an internal combustion heating unit, means for selectively feeding fuel to the burners of a multi-burner heating unit to provide the amount of heat required to heat a space to a predetermined temperature.

A feature of this invention is the provision in an internal combustion heating system having a plurality of burners, of an automatic control system for providing fuel to one or more of the burners, depending upon the amount of heat required.

A further feature of this invention is the provision in an internal combustion heating system having a plurality of burners, of an automatic control system having a temperature responsive means positioned to be responsive to the temperature of the intake air of the heater connected to a selector system for operating valve means to provide fuel to one or more of the burners in accordance with the temperature of the intake air.

A still further feature of this invention is the provision of a temperature-operated system for controlling the flow of fuel to the burners of a multi-burner liquid fuel burning heater to heat a space to a predetermined temperature including a temperature responsive unit which is responsive to the temperature of the intake air of the heater and in which the range of temperatures to which the unit is responsive can be varied to provide the temperature desired.

Further objects, features, and advantages of my invention will be apparent from a consideration of the following description taken in connection with the accompanying drawings in which:

Fig. 2 is a cross-sectional view showing the operation of one embodiment of the fuel-feeding system according to the invention;

Fig. 3 is a cross-sectional view along the lines 3—3 of Fig. 2;

Fig. 4 is a cross-sectional view of a modified fuel-feeding system;

In practicing my invention I provide a fuel-feeding system for an internal combustion heater having a combustion chamber with a plurality of burners therein, a fan for drawing the combustion air through the combustion chamber, a second fan for circulating air to be heated over the combustion chamber, and a fuel pump for providing fuel for the burners. The fuel-feeding system may be applied to many types of internal combustion heaters, but I have applied this system to the heater structure as disclosed in the patent of John A. Richards, Patent Number 2,492,654, issued December 27, 1949. The fuel-feeding system includes a selector unit having a fuel chamber therein with an inlet and a plurality of outlets connected to the burners in the combustion chamber. Valve means are provided for the outlets so that fuel may be fed to one or more burners at any given time. The system further includes a temperature responsive unit having a bellows-enclosed chamber containing a fluid having a high temperature coefficient of expansion, causing expansion or contraction of the bellows, depending upon the temperature of the surrounding air. The bellows is positioned in the intake air stream of the heater so that it will be responsive to the air being received from the space to be heated. An electrical heating element is provided in the temperature responsive unit having a manual variable control for regulating the amount of energy supplied thereto. The temperature responsive unit is also responsive to the temperature of the heating element so that by varying the heat of the element the range over which the temperature responsive device operates may be varied as desired. The temperature responsive unit may be connected to the selector unit by mechanical means or may be used to control a valve regulating the pressure of the fuel fed to the selector unit with the selector unit operating to feed fuel to one or more outlets in accordance with the pressure of the fuel supply thereto.

Figure 1:
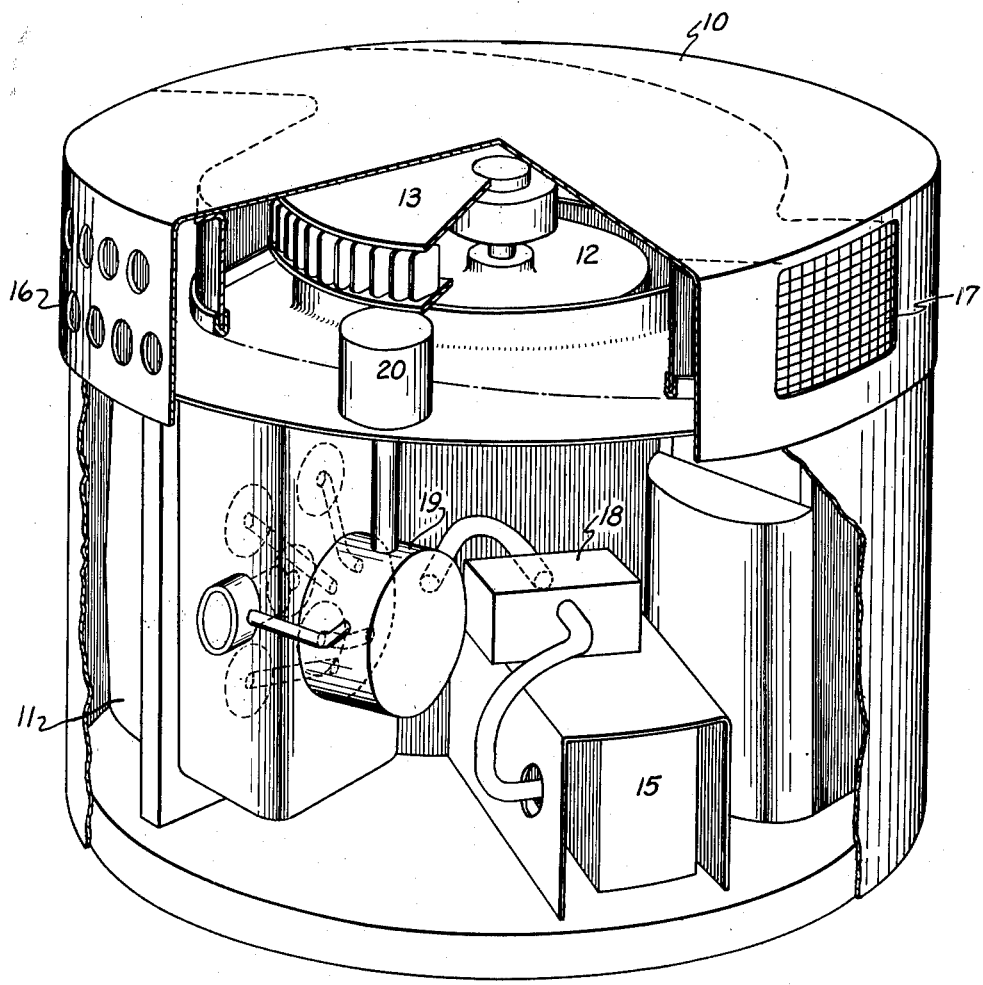
Fig. 1 is a perspective view showing the association of the fuel-feeding system with an internal combustion heating unit.

Referring now to the drawings, in Fig. 1 is shown a heater 10 having a C-shaped combustion chamber 11 with a plurality of burners positioned therein, a motor 12 is positioned in the space surrounded by the combustion chamber 11 and drives a fan 13 for circulating air to be heated around the combustion chamber. A second fan (not shown) positioned at the other end of the motor provides a suction for drawing air through the combustion chamber and exhausting it from the heater. The fuel pump 15 is also driven by the motor 12 and provides fuel for the burners. Openings 16 are provided in the casing for the heater for the intake of air to be heated, and openings 17 are provided for discharge of heated air. The fuel-feeding system consists of a pressure regulator 18, a selector 19, and a temperature responsive unit 20. As shown in Fig. 1, the pressure regulator is positioned in the fuel line between the pump and the selector to insure that fuel is fed to the selector at a substantially constant pressure. The selector is positioned adjacent to the combustion chamber and provides fuel to the burners therein. The temperature responsive unit is positioned in the intake air passage and has openings to permit the air coming into the heater to surround the temperature responsive element therein.

Figs. 2 and 3 show the details of the fuel-feeding system. The pressure regulator 18 includes a base member 21 and pressed metal portions 22 and 23 which cooperate to support a diaphragm 24 therebetween. A chamber 25 is formed between the upper surface of the diaphragm 24, housing member 22 and base member 21 into which the fuel is fed by the fuel pump 15. The base member 21 has an opening 21a therein through which fuel flows to the chamber 25 from fuel line 26. A valve 27 is positioned in the opening 21a and has a slot 27a permitting fuel to pass therethrough. The valve 27 has a point which rests against the diaphragm stud 28 and causes the valve to be actuated by movement of the diaphragm. A spring 29 is positioned between the diaphragm and a threaded end member 30 which may be adjusted relative to housing 23 to provide the pressure desired against the diaphragm. A spring 31 is provided to hold the valve against the diaphgram and is held in place by the insert 32 threaded in base member 21. A second opening 21b is provided in the base member connecting the chamber 25 with the fuel line 33 from the pressure regulator to the selector 19.

The springs operating on the valve and diaphragm assembly are adjusted so that the valve is normally raised in the opening 21a permitting fuel to flow into the chamber 25. The fuel will then flow from chamber 25 through fuel line 33 to the selector. If more fuel is being provided than is required by the selector, pressure will be built up in chamber 25 causing the diaphragm to move downward and the valve to close the opening 21a. By adjustment of the end member 30 the pressure of spring 29 on the diaphgram can be made such that the diaphragm will respond to the pressure desired. In actual practice the spring is adjusted to cause the diaphgram to operate to close the valve at a pressure of 6 inches of water or thereabouts.

The selector 19 is composed of a base member 35 and a cap member 36 having a diaphragm 37 positioned therebetween. The base member has a fitting 38 for connecting thereto the fuel line 33 from the pressure regulator. The fuel line is connected to a chamber 39 in the selector unit between the base member 35 and the diaphragm 37 by a passage 35a in the base member. The base member has an annular recess therein in which an insert 40 is placed, having four openings 40a as shown in Fig. 3. The insert also has an opening 40b therein for a plunger 41 which is secured to diaphragm 37 and on which is supported a spider member 42. The spider member 42 carries four needle valves 43 adapted to cooperate with openings in the insert. A spring member 44 holds the needles in place in the spider member and holds the valves closed when the diaphragm is in the normal position. A coil spring 45 is positioned between the plunger and the base member and tends to hold the valves in an open position. The spider member 42 includes recesses 42a under the heads of three of the needle valves. The recesses are of different depths so that as the plunger moves the valves will be selectively opened or closed. That is, as the plunger moves to the left to open the valves, first the valve having no recesses will be opened and the other needle valves will remain closed as the heads thereof will rest in the recesses. As the plunger and spider member moves farther the other valves are selectively opened, depending upon the depth of the recesses in the spider member, until the valves are all opened. Accordingly, it can be seen that fuel is fed to the various burners through the tubes 46 connecting with the openings 40a, depending upon the position of the diaphragm 37. An additional opening 35b is provided in the base member 35 communicating with the fuel chamber to provide a supply of fuel for an igniter and/or a pilot burner, through the fuel line 47. This opening is not controlled by the selector valves as the igniter and/or pilot burner will be operated at all times when the heater is operating, and accordingly is not controlled by the selector and temperature responsive device. The cap member 36 of the selector encloses a crank 48 having a set screw 49 therein which bears against a stud 37a of the diaphragm 37. The screw 49 is arranged to oppose the action of the spring 44 and force the plunger into such a position that the needle valves close the fuel passages to the burners.

The temperature responsive device is coupled to the selector unit by a threaded pipe 50 having actuating member 51 positioned in the opening therein and contacting the crank 48 of the selector. The coupling member is threaded into the supporting plate 52 which may be a part of the housing of the heater as shown in Fig. 1. The housing 53 for the temperature responsive device is secured to the plate member 52 and includes openings 53a therein for entry of air. The temperature responsive device includes an insulating member 54 having a portion projecting through the housing 53 and secured thereto by the nut 55. The insulating member has a heating coil 56 positioned on a portion thereof and supports a cup-shaped member 57 which surrounds the heating coil. The member 57 forms an end of the bellows chamber 60 which is further defined by the bellows 58 and the end member 59. This chamber is filled with ethyl-chloride or other suitable fluid having a high temperature coefficient of expansion to cause relative movement between the end member 59 and the fixed member 57 as the temperature of the air surrounding the chamber varies. The member 59 abuts the plate member 61 which is connected to the actuating shaft 51. A spider member 62 having portions projecting through openings 53 in the supporting member 52 cooperates with spring 63 and retainer 64 for holding the plate assembly 61 against the end member 59 of the bellows unit. As the fluid in the bellows chamber expands, the bottom member will force the plate member 61 against the tension of the spring 63 causing the actuating member 51 to bear against the crank 48 and close the valves in the selector unit. As is seen from the foregoing, the valves are normally in an open position and as the air entering the heater comes in contact with the temperature responsive unit the expansion of the fluid in the bellows chamber causes the actuating member to selectively close the valves to the fuel feed lines of the burners.

In Fig. 4 is shown a modification of the fuel-feeding system in which the temperature responsive unit and selector unit are combined into one unit having a body portion 65 housing the valve mechanism and a cap portion 66 positioned over the temperature responsive unit. The cap portion 66 is adapted to be positioned in the intake air passage of the heater as previously described. A diaphragm 67 is positioned between the base member and the cap member and has supported thereon a plunger 68 carrying a spider member 69 which supports a plurality of needle valves 70. The needle valves cooperate with openings in the base member in the same manner as in the structure of Fig. 2. Instead of providing recesses in the spider member for the heads of the valves as in Fig. 2, the needle valves are of different lengths so that as the spider member 69 moves the valves will be selectively opened depending on the respective lengths thereof. Individual springs 70a are provided bearing on the diaphragm structure which tend to hold the valves in closed position. A spring 72 is provided about the plunger 68 for holding the diaphragm against the bellows unit.

The temperature responsive bellows unit 73 is arranged to bear directly on the diaphragm 67 and is identical in structure to bellows unit of Fig. 2 and accordingly, will not be described in detail. In Fig. 4 a heating unit 71 is positioned in opening 66a in the cap member 66 instead of the heating coil 56 positioned on the insulating member in Fig. 2. In this structure the cap member 66 has openings 66a and 66b positioned therein to permit air entering the heater to contact the temperature responsive unit. The heating unit 71 includes an electrical heating coil connected to a source of electrical energy as shown in Fig. 2 and described later. Clearance is provided between the heating unit 71 and the opening 66a in the cap member to permit the air to pass around the heating element into the space surrounding the bellows enclosed temperature responsive fluid.

The liquid fuel chamber 74 in the base member or body portion 65 contains the valves 70 and is closed on its upper side by the diaphragm 67, which forms a fluid-tight seal. Liquid fuel is admitted to the chamber 74 through the inlet passage 74a. An outlet passage 74b, not controlled by any of the valves 70, leads to a pilot burner or the like. Outlet passages 74c, with which the needle valves 70 are aligned, communicate with fuel lines 74d leading respectively to the main burners of the heater. The diaphragm 67 and the valves 70 move with the lower end of the bellows 73 in response to temperature changes, and the valves 70 are adapted to open and close in sequence as described above in connection with Fig. 2.

Figure 5:
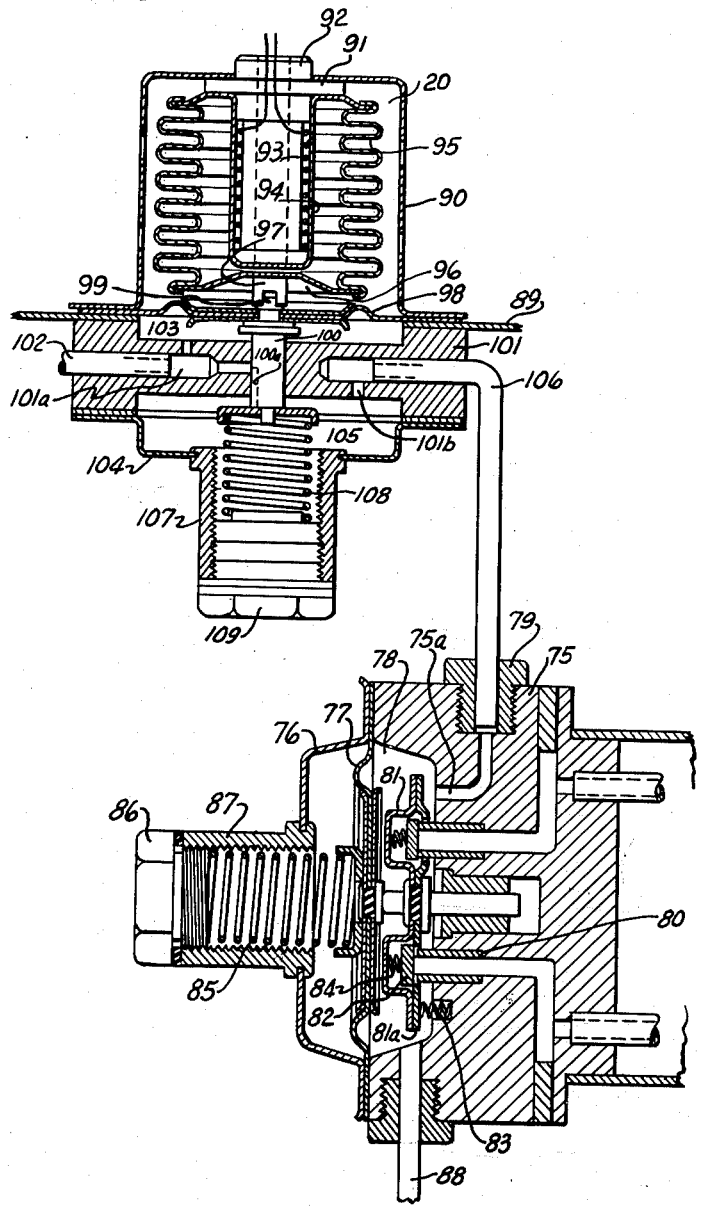
Fig. 5 is a cross-sectional view of still a third variation of the fuel-feeding system according to the invention.

Fig. 5 shows still another modification of the fuel-feeding system according to the invention. In this modification a selector is provided which includes a body portion 75 and a cap portion 76 with a diaphragm 77 positioned therebetween. A fuel chamber 78 is formed in the selector unit by a recess in the body portion 75 and the diaphragm 77. A fuel fitting 79 is provided for connection to a fuel line and communicates with the chamber 78 through a passage 75a in the base member. The base member includes openings having tubular inserts 80 which communicate with tubular passages leading to the burners in the multi-burner unit. Instead of needle valves as shown in the previous modifications, Bakelite disc valves are provided for selectively opening and closing the outlets from the fuel chamber to the burners. A spider assembly 81 is provided for opening the Bakelite discs 82 of the valves and includes an actuating member 81a which fits under the Bakelite discs to open the valves as the spider member is moved. The actuating member has recessed portions under the discs of all of the valves except one, the extent of the recess being different in each case to selectively operate the valves in a manner similar to the operation of the structure of Fig. 2 previously described. Spring members 83 are positioned between the base member 75 and the spider member 81 and tend to hold the valves in open position. Springs 84 are positioned between the spider member and the discs 82 and tend to hold the disc against the inserts of the base member or against the actuating portion 81a of the spider depending upon the position of the spider member. A spring 85 bears against the diaphragm to oppose the pressure created by the fuel in the chamber 78. The screw 86 is adjustably threaded in the tubular member 87 secured to the cap portion 76 to permit varying the pressure of the spring 85. As in the previous modifications an outlet 88 is provided in the selector not controlled by the valves to provide fuel to an igniter and/or a pilot burner in the combustion chamber. As previously stated these units are in operation at all times the heater is in operation and accordingly this outlet is not controlled by the selector valves.

The pressure of the fluid in chamber 78 of the selector is controlled by a temperature responsive device which is similar to the temperature responsive device disclosed in previous modifications. This device includes a main supporting member 89 with a cap portion 90 positioned thereon enclosing a temperature responsive bellows unit. An insulating insert 91 is secured to the top of the cap member 90 by nut 92 as in the structure of Fig. 2. A heating coil 93 is wound around the insulating insert and a cup-shaped member 94 completely encloses the heating coil. The member 94 is secured to the insulating insert 91 and further serves as a fixed end for the bellows chamber. The bellows 95 and end plate 96 complete the chamber which is filled with a fluid having a high temperature coefficient of expansion. As the temperature of the bellows unit is varied by contact with the incoming air, the fluid therein contracts and expands resulting in movement of the end plate 96.

The movement of the bellows unit is utilized to operate a valve for controlling the flow of fuel to the selector. The valve includes a plunger 100 operating in an opening in base member 101. The plunger is secured to a diaphragm 98 to which the movement of the bellows member is transmitted through projection 97 on the end plate 96 of the bellows unit and stud 99 on the diaphragm 98. The base member 101 has an opening 101a therein for entry of fluid from tube 102 leading from the fuel pump. This passage permits entry of the fuel to a chamber 103 which is formed between the diaphragm 98 and the base member 101, and also through the slot 100a in the plunger 100 to a chamber 105 formed between the base member 101 and a plate member 104 secured thereto. The fuel from the chamber 105 can enter the passage 101b in the base member to the tube 106 leading to the selector unit. The end plate 104 supports a tubular member 107 secured thereto enclosing the spring 108 which co-operates with the plunger 100 to hold the diaphragm 99 against the bellows unit. An end member 109 is threaded in the tubular member to permit adjustment of the tension of the spring.

The operation of the structure of Fig. 5 is similar to the operation of the previous modifications except that the control of the selector by the temperature responsive units is through the pressure of the fuel rather than through a mechanical linkage. In the normal position the fuel is allowed to flow through the valve connected to the temperature responsive unit through tube 106 to the selector causing pressure within the chamber 78, to push the diaphragm 77 against the spring 85 and cause the actuating portion 81a to lift the disc valves allowing the fuel from the chamber 78 to enter the passages to the burners. As the temperature of the air entering the heater is increased, the fluid within the bellows unit expands causing the plunger 100 to move downward so that the slot 100a registers with only a part of the opening of the passage 101a and the amount of fuel fed to the selector unit is decreased. Accordingly, the pressure in the chamber 78 is decreased and the spring 85 forces against the diaphragm 77 to cause the spider to move toward the base member and the springs 84 to hold the disc valves over the inserts and cut off the supply of gas to the burners. A separate pressure regulator unit is not required in this modification of the invention as the temperature controlled valve provides a complete control of the flow of fuel to the selector. If the flow is increased due to increased pressure of fuel from the pump, additional valves in the selector will open causing more heat which will cause the temperature responsive element to close the valve.

In the structure shown, it will be noted that a very small movement of the selector diaphragm will cause the valves to be selectively opened or closed. By altering the depth of the recesses in the spider members of Figs. 2 and 5 or by altering the difference in length of the needle valves in Fig. 4, the movement of the diaphragm required to operate the valves can be changed. Also by varying the dimensions of the bellows chamber the amount of movement which will be provided by a given temperature change, can be fixed to provide the movement required to actuate the valves.

Now the operation of the temperature responsive bellows and the electrical heating unit associated therewith, will be explained. The electrical heating coil 56 of Fig. 2 has leads a and b which provide power thereto from battery c through switch contact d and resistor e. Although a battery is disclosed as the source of power any suitable source of electrical energy may be used. When the switch contact is made at the point marked 75 the circuit will be open and no heat will be produced by the heating unit. When the heating unit is in such inoperative condition the bellows unit is adapted to control the heater to provide a temperature of 75 degrees for example. The bellows unit in such case is designed to respond to the temperature range of from 73 to 77 degrees. That is, if the temperature of the incoming air is 77 degrees the valves to all the burners except the pilot burner will be closed, and when the temperature drops to 73 degrees the valves to all will be opened to increase the output of the heater. At intermediate temperatures a part of the valves will be open. If in colder weather it is desired that the temperature of the automobile or other space being heated be raised to only 65 degrees for example, this can be done by providing heat in the vicinity of the temperature responsive means. This is accomplished by placing the switch contact at the point marked 65 for example, which will cause current to flow through the heating coil. The heat provided by the electrical heating element will supplement the heat provided by the air to provide the same amount of heat exchanged through the bellows as though the air itself was 75 degrees instead of 65 degrees.

In the modification shown in Fig. 4 the coil 71 would be connected in the same manner as the coil 56 of Fig. 2. The air entering the temperature responsive unit is in this structure actually heated by the electrical heating coil 71, thus by raising the temperature of the air 10 degrees the unit is responsive to a temperature range of from 63 to 67 degrees instead of 73 to 77 degrees. Accordingly, by moving the switch contact to the points marked 55 or 50 and thus reducing the resistance in the circuit, more heat is provided by the heating element and the range of the device is lowered still further. By the use of a continuously variable resistance in series with the heating element it is possible to make the device operative to automatically provide any temperature desired in the space to be heated over a very wide range of temperatures.

It is pointed out that the various valve structures shown in the selector units of Figs. 2, 4 and 5 are completely interchangeable and any one can be used. The various illustrations are presented to indicate that any suitable valve structure which is available can be used within the province of my invention. Also the modifications of the electrical heating unit for the temperature responsive element are completely interchangeable and the modification most desirable in a particular application can be used.

From the foregoing it is seen that an automatic device is provided for selectively providing fuel to the burners of a multiple burner heater to automatically provide the temperature desired in the space being heated. The device is simple of construction and is very small permitting its use in portable and automobile heaters where a small amount of space is available.

Although the invention has been described with reference to specific structures and specific combinations of units, it is apparent that other combinations of the units and modifications and variations of the units themselves are possible and are within the scope of this invention. Accordingly, it is intended that the invention be limited only to the extent defined by the scope of the appended claims.

I claim:

1. In an internal combustion heating system having a housing with openings for air to be heated and for discharge of heated air, a combustion chamber and a plurality of burner units operatively connected to said combustion chamber; a selector unit for feeding fuel to said plurality of burners having a fuel chamber therein, means for feeding fuel under pressure to said selector chamber including main valve for controlling the pressure of the fuel in said selector chamber, means forming a plurality of passages individually connecting said fuel chamber and said burners for feeding fuel thereto, a plurality of valves individually associated with said passages, and means in said fuel chamber movable in accordance with the pressure therein and connected to said valves for operating the same, said last-named means being movable to a first position in which said valves are all closed to other positions in which said valves are selectively opened to provide fuel to one or more of said burners, said main valve including temperature responsive means located in said housing adjacent said openings for air to be heated, automatically operating the same in response to the temperature of the air entering the heater.

2. In an internal combustion heating system having a housing with openings for intake of air to be heated and for discharge of heated air, a combustion chamber, and a plurality of burner units operatively connected to said combustion chamber; a selector unit for feeding fuel to said plurality of burners having a fuel chamber therein, a plurality of passages from said fuel chamber to said burners for feeding fuel thereto, a plurality of valves in said passages adapted to open in selected numbers in accordance with the pressure in said fuel chamber to provide fuel to one or more of said burners, means for supplying fuel to said fuel chamber including a main valve for controlling the pressure of the fuel in said fuel chamber, and a temperature responsive unit positioned in the intake air opening of said heater for actuating said main valve, an electrical heating element operatively associated with said temperature responsive unit, and means for providing a varying amount of electrical energy to said heating element, said temperature responsive unit being adapted to operate said main valve to control the pressure of the fuel in said fuel chamber in accordance with the temperature of the intake air and the temperature of said electrical heating element.

3. A temperature-responsive fuel metering device for a combustion type air heater adapted to utilize liquid fuel, such device comprising means defining a chamber for liquid fuel including a flexible diaphragm as a wall of the chamber, said chamber having a plurality of outlet passages communicating with the heater for supplying fuel thereto, valve means in said chamber operated by said diaphragm and adapted to open and close said outlet passages in selected numbers depending upon the position of said diaphragm, an expansible thermal element outside of said chamber to control the position of said diaphragm in accordance with the temperature of the incoming air to be heated, an enclosure surrounding said thermal element and having openings of limited size therein to restrict the flow of air contacting said thermal element, an electric heating element positioned in proximity to said element, adjustable resistance means selectively controlling the energization of said heating element, and motion-transmitting means for causing said diaphragm to follow the expansions and contractions of said thermal element.

4. A temperature-responsive fuel metering device for a combustion type air heater adapted to utilize liquid fuel, such device comprising means defining a chamber for liquid fuel including a diaphragm forming a wall of the chamber, said chamber having a plurality of outlet passages communicating with the heater for supplying fuel thereto, a plurality of valves in said chamber respectively cooperating with said outlet passages, a common actuating element for said valves connected to said diaphragm for movement therewith, means yieldably retaining said valves on said actuating element, said valves being arranged to open and close said outlet passages in predetermined sequence as said diaphragm moves between the limits of its travel, a bellows unit disposed on the outer side of said diaphragm and having a movable portion connected to said diaphragm, said bellows unit being filled with a fluid having a high thermal coefficient of expansion and contraction, an enclosure surrounding said bellows unit, said enclosure having openings therein for admitting a restricted flow of air from the space heated by said heater, and an electrical resistance element disposed in one of said openings for modifying the temperature of the air passing into said enclosure.

5. A liquid fuel heater of the type for use in automobiles and small home installations including in combination a compact housing with openings therein for intake of the air to be heated and discharge of air after heating, a combustion chamber in said housing, a plurality of burners cooperating with said combustion chamber, means for selectively supplying liquid fuel under pressure to said burners in accordance with the heat output required of said heater, said last mentioned means including means having a closed chamber therein, a plurality of fuel outlet passages connecting said chamber to said burners, a flexible diaphragm defining one wall of said chamber, and a plurality of valves secured to said diaphragm and cooperating with said outlet passages to sequentially close the same upon flexure of said diaphragm, and means for controlling the flexure of said diaphragm in accordance with the temperature of the heated space including a temperature responsive device operatively connected to said diaphragm, and a variable heat-generating element disposed adjacent said temperature responsive device to control the operation of the same, said temperature responsive device being actuable in accordance with the temperature of the intake air entering the heater and the temperature of said element.

6. A liquid fuel heater of the type for use in automobiles and small home installations including in combination a compact housing with openings therein for intake of the air to be heated and discharge of the air after heating, a combustion chamber in said housing, a plurality of burners cooperating with said combustion chamber, means for selectively supplying liquid fuel under pressure to said burners in accordance with the heat output required of said heater, said last mentioned means including means having a closed chamber therein, a plurality of fuel outlet passages connecting said chamber to said burners, a control member movably mounted within said chamber and including a portion extending through a wall of said chamber, and a plurality of valve means secured to said member and cooperating with said outlet passages to sequentially close the same upon movement of said member, and means for controlling the movement of said member in accordance with the temperature of the intake air entering the housing including a temperature responsive device operatively connected to said portion of said control member, and a variable heat-generating element disposed adjacent said temperature responsive device to control the operation of the same, said temperature responsive device being actuable in accordance with the temperature of the intake air entering the housing and the temperature of said variable heat generating element.

STANLEY J. BUDLANE.

REFERENCES CITED

The following references are of record in the file of this patent:

UNITED STATES PATENTS

| Number | Name | Date |
|---|---|---|
| 1,449,998 | Hunter | Mar. 27, 1923 |
| 1,633,066 | Breese | June 21, 1927 |
| 1,742,880 | Stockstrom | Jan. 7, 1930 |
| 1,760,081 | Parks | May 27, 1930 |
| 1,819,560 | Klees | Aug. 18, 1931 |
| 1,822,047 | Leask | Sept. 8, 1931 |
| 1,918,265 | Hartwig | July 18, 1933 |
| 1,927,036 | Johnson | Sept. 19, 1933 |
| 1,977,216 | Unger | Oct. 16, 1934 |
| 2,008,151 | Nest | July 16, 1935 |
| 2,121,977 | Newell | June 28, 1938 |
| 2,177,544 | Warner | Oct. 24, 1939 |
| 2,266,975 | Landon | Dec. 23, 1941 |
| 2,271,120 | Grant | Jan. 27, 1942 |
| 2,355,043 | Adlam | Aug. 8, 1944 |
| 2,356,928 | Hann | Aug. 29, 1944 |
| 2,362,045 | Bliss | Nov. 7, 1944 |
| 2,383,641 | Focke | Aug. 28, 1945 |